(12) United States Patent
Anglin et al.

(10) Patent No.: US 10,255,170 B2
(45) Date of Patent: Apr. 9, 2019

(54) ON-DEMAND CODESET CONVERTER GENERATION

(71) Applicant: INTERNATIONAL BUSINESS MACHINES CORPORATION, Armonk, NY (US)

(72) Inventors: Debbie A. Anglin, Leander, TX (US); Su Liu, Austin, TX (US); Boyi Tzen, Taipei (TW); Yang Fan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/382,800

(22) Filed: Dec. 19, 2016

(65) Prior Publication Data

US 2018/0173509 A1    Jun. 21, 2018

(51) Int. Cl.
*G06F 9/44* (2018.01)
*G06F 11/36* (2006.01)
*G06F 8/41* (2018.01)
*G06F 8/52* (2018.01)

(52) U.S. Cl.
CPC ............ *G06F 11/3684* (2013.01); *G06F 8/41* (2013.01); *G06F 8/52* (2013.01)

(58) Field of Classification Search
CPC .............................. G06F 8/447; G06F 11/3684
USPC .................................................. 717/139–141
See application file for complete search history.

(56) References Cited

U.S. PATENT DOCUMENTS

| 3,374,466 | A | * | 3/1968 | Womack | G06F 12/0615 711/206 |
| 5,479,167 | A | * | 12/1995 | Murakami | H03M 7/00 341/90 |
| 5,898,874 | A | * | 4/1999 | Gelfenbain | G06F 17/2217 717/140 |
| 6,691,125 | B1 | * | 2/2004 | Engle | G06F 17/30067 |
| 6,886,160 | B1 | * | 4/2005 | Lee | H04L 67/06 717/173 |
| 9,335,994 | B2 | * | 5/2016 | Carlough | G06F 9/30025 |
| 9,384,064 | B2 | | 7/2016 | Deivanayagam et al. | |
| 2006/0271921 | A1 | | 11/2006 | Cronce et al. | |
| 2011/0035732 | A1 | | 2/2011 | Crisman | |
| 2013/0174131 | A1 | | 7/2013 | Takeuchi | |

(Continued)

OTHER PUBLICATIONS

Oracle, "Oracle Tuxedo Application Rehosting Workbench", Apr. 2014, Oracle Corporation, Reference Guide, 12c Release 2 (12.1.3), 422 pages.*

*Primary Examiner* — Ted T. Vo
(74) *Attorney, Agent, or Firm* — Cantor Colburn LLP; Noah Sharkan (57) ABSTRACT

A computer-implemented method includes receiving from a codeset compiler a request for a codeset converter to convert from a source codeset to a target codeset. A mapping table is generated responsive to the request, where the mapping table maps from the source codeset to the target codeset. An applicable codeset converter compiler is selected, from among a plurality of available codeset converter compilers, for compiling a requested codeset converter from the source codeset to the target codeset. The requested codeset converter is compiled with the applicable codeset converter compiler, using a computer processor, responsive to the request. The requested codeset converter is returned to the codeset compiler.

20 Claims, 5 Drawing Sheets

(56) References Cited

U.S. PATENT DOCUMENTS

2015/0088548 A1     3/2015    Charlot et al.
2015/0378688 A1    12/2015    Jiang et al.

\* cited by examiner

ON-DEMAND CODESET CONVERTER GENERATION

BACKGROUND

Embodiments of the present invention relate to codeset generation and, more specifically, to on-demand codeset converter generation.

A codeset is an encoding of characters understandable by a computer system. For instance, although a set of characters and strings appears in a message directed to a user at a computer, the computer receives an encoding of those characters that must be interpreted. However, different computer systems or applications are configured to handle different encodings. This can be problematic when displaying on one computer or application a document that was generated on a different computer or application. If the two computers or applications use different codesets, then the document will appear differently on the screen and, in some cases, may be unreadable.

Codeset converters exist to convert between codesets, or encodings. With a codeset converter, a computer system can convert between codesets. Thus, a document from a computer system that used a first encoding can become readable on a computer system that uses a second encoding. Codeset conversion is an important feature in multi-national server operation systems. Finding and loading codeset converters are often necessary for information exchange, security authentication, data transfer, and database access.

A mapping table can be defined for converting a character set of one codeset (i.e., selected characters from the codeset) to another codeset. A converter from one codeset to another is based on such a mapping table. However, occasionally, a mapping between codesets may change and require updating due to changes in industry standards, and as such, both the mapping table and the converter will also require updating. Service providers offer codeset converter compilers, which compile codeset converters and are designed to generate updated codeset converters based on updated mapping tables. For instance, a user requests a codeset converter compiler with certain parameters, including a new mapping table. The service provider provides the requested codeset converter compiler, and the user runs it, resulting in a new codeset compiler. The user can then use the new codeset converter for future conversions.

SUMMARY

According to an embodiment of this invention, a computer-implemented method includes receiving from a codeset compiler a request for a codeset converter to convert from a source codeset to a target codeset. A mapping table is generated responsive to the request, where the mapping table maps from the source codeset to the target codeset. An applicable codeset converter compiler is selected, from among a plurality of available codeset converter compilers, for compiling a requested codeset converter from the source codeset to the target codeset. The requested codeset converter is compiled with the applicable codeset converter compiler, using a computer processor, responsive to the request. The requested codeset converter is returned to the codeset compiler.

In another embodiment, a system includes a memory having computer-readable instructions and one or more processors for executing the computer-readable instructions. The computer-readable instructions include receiving from a codeset compiler a request for a codeset converter to convert from a source codeset to a target codeset. Further according to the computer-readable instructions, a mapping table is generated responsive to the request, where the mapping table maps from the source codeset to the target codeset. An applicable codeset converter compiler is selected, from among a plurality of available codeset converter compilers, for compiling a requested codeset converter from the source codeset to the target codeset. The requested codeset converter is compiled with the applicable codeset converter compiler, responsive to the request. The requested codeset converter is returned to the codeset compiler.

In yet another embodiment, a computer-program product for compiling a codeset converter includes a computer-readable storage medium having program instructions embodied therewith. The program instructions are executable by a processor to cause the processor to perform a method. The method includes receiving from a codeset compiler a request for a codeset converter to convert from a source codeset to a target codeset. Further according to the method, a mapping table is generated responsive to the request, where the mapping table maps from the source codeset to the target codeset. An applicable codeset converter compiler is selected, from among a plurality of available codeset converter compilers, for compiling a requested codeset converter from the source codeset to the target codeset. The requested codeset converter is compiled with the applicable codeset converter compiler, responsive to the request. The requested codeset converter is returned to the codeset compiler.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

One significant drawback of codeset conversion is that service providers must remain involved to provide codeset converter compilers based on users' parameters. While it is possible for a user to compile a codeset converter on his own, using a standard codeset converter compiler, the process requires significant technical skill and knowledge and is error prone. For instance, to compile a codeset, the user must have an appropriate mapping table. However, the standard codeset compiler cannot verify the accuracy of that mapping table. Further, the standard codeset compiler cannot generate test cases that enable a user to verify a compiled codeset converter.

Turning now to an overview of aspects of the present invention, some embodiments of a compiling system provide a software as a service (SaaS) service for generating codeset mapping tables, compiling codeset converters, and providing test cases to enable verification of those codeset converters. Further, some embodiments prove a mechanism for cloud-sourced sharing and improving conversion rules, as well as evaluating codeset mapping tables.

Figure 1:
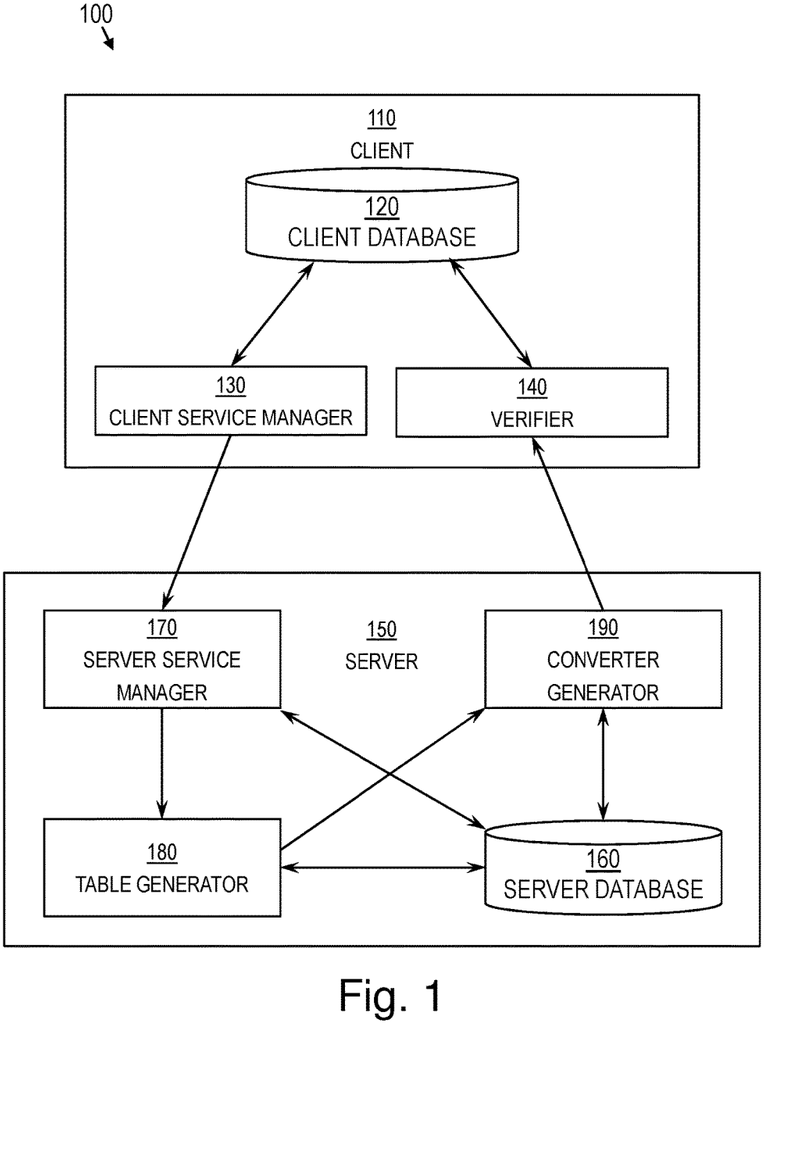
FIG. 1 is a block diagram of a compiler system for compiling of a codeset converter, according to some embodiments of this invention.

FIG. 1 is a block diagram of the compiling system 100, according to some embodiments of this invention. A shown in FIG. 1, the compiling system 100 may include at least one of a client 110 and a server 150. It will be understood that, although only a single client 110 is shown, multiple clients 110 having similar functions to the one shown and described herein may be in communication with the server 150. As a result, the server 150 may provide services for multiple clients 110.

The client 110 may be or include a local codeset compiler, which may include a client database 120, a client service manager 130, and a verifier 140. Generally, the client database 120 may maintain mapping tables and mapping rules known to the client 110; the client service manager 130 may request and receive a codeset converter from the server 150; and the verifier 140 may verifier the codeset converter received based on test cases provided by the server 150. These operations will be described further below.

The server 150 may include a server database 160, a server service manager 170, a table generator 180, and a converter generator 190. Generally, the server database 160 may be crowd-sourced and may include information about known codeset aliases, codeset mappings, and conversion rules; the server service manager 170 may receive a request for a codeset converter from the client 110 and may normalize parameters in the request; the table generator 180 may generate a mapping table to comply with the request; and the converter generator 190 may compile the requested codeset converter, along with one or more test cases for verifying the requested codeset converter. These operations will be described further below.

It will be understood that, although these components of the client 110 and the server 150 are shown and described as being distinct, this distinction is for illustration purposes only, and the above components may be combined or further divided based on design decisions.

It will be further understood that, in some embodiments, both the client 110 and the server 150 may be implemented on a single computing device. In such embodiments, the client 110 and server 150 may behave as a standalone codeset compiler converter, which need not access cloud services to compile a codeset converter. Alternatively, however, when the client 110 and the server 150 operate remotely, the client 110 may utilize the server's codeset converter compiling as a cloud service.

Figure 2:
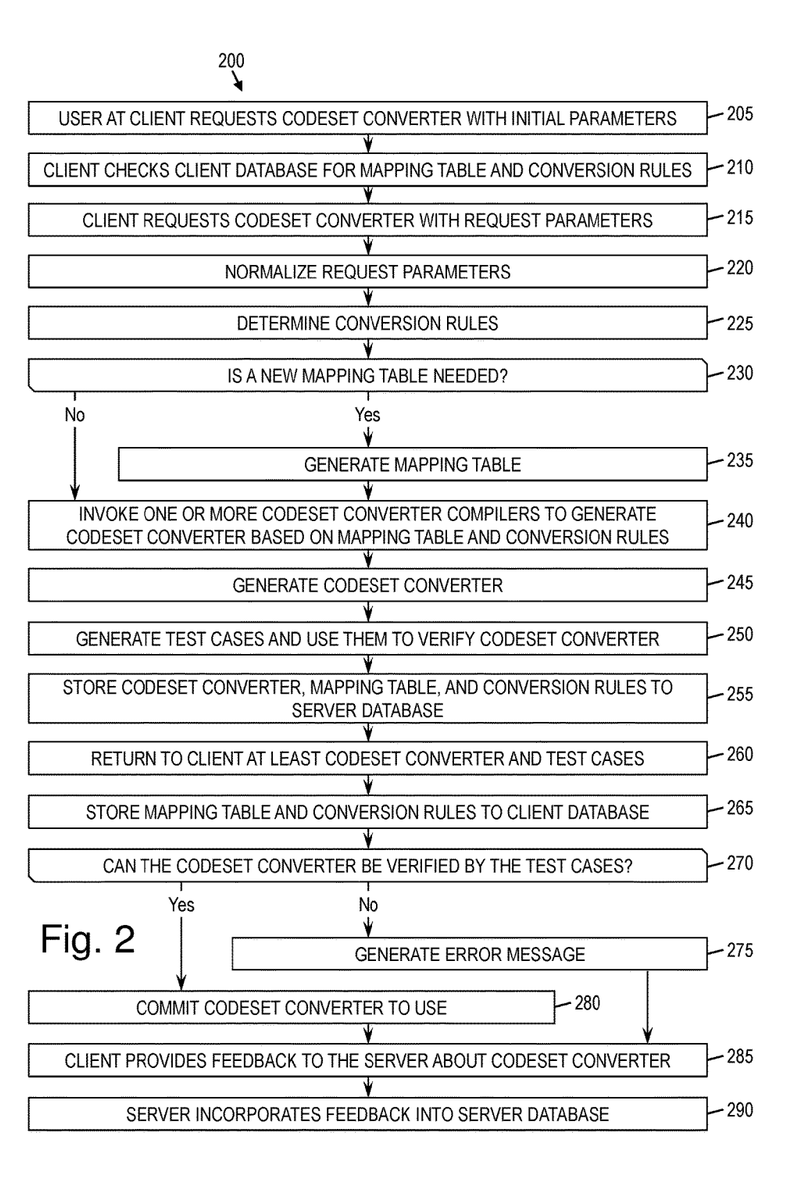
FIG. 2 is a flow diagram of a method for compiling a codeset converter, according to some embodiments of this invention.

FIG. 2 is a flow diagram of a method 200 for compiling a codeset converter, according to some embodiments of this invention. Specifically, this method 200 describes operations for generating a codeset converter compiler to convert from a source codeset to a target codeset. In some embodiments, the server-side operations of this method 200 may be performed through a cloud service provided by the server 150. Thus, in some embodiments, no service provider needs to be actively involved in the method 200.

As shown in FIG. 2, at block 205, a user at a client 110 can request a codeset converter based on a set of one or more initial parameters. Those initial parameters may include, for example, a codeset mapping table or mapping table identifier to be used as a basis for the conversion, the source codeset from which conversion is desired, and the target codeset to which conversion is desired. In some embodiments, at block 210, the client 110 may check the client database 120 for an applicable mapping table, if not provided as an initial parameter, as well as applicable conversion rules. Applicable mapping tables may include various mapping tables related to the conversion, such as a mapping table from the source codeset to the target codeset, from the target codeset to the source codeset, or multiple mappings that can be potentially chained from go from either the source codeset to the target codeset or the reverse. For example, and not by way of limitation, if the initial parameters include a mapping table identifier, the client 110 may search for the identified mapping table in the client database 120. Analogously, conversion rules may be one or more rules stored in the client database that are related to the desired conversion.

At block 215, the client 110 may request from the server 150 a codeset converter based on a set of request parameters. This set of request parameters may be the same or similar to the initial parameters specified by the user. However, for example, this set of request parameters may further include one or more mapping tables not in the initial parameters, if any, and one or more conversion rules, if any, found in the client database 120.

The server 150 may receive the request. At block 220, the server 150 may normalize the request parameters received. In some embodiments, this may be performed by comparing the request parameters with the server database 160, which may maintain codeset aliases as well as codeset identifiers and details. Further, in normalizing the request parameters, the server 150 may convert outdated codeset identifiers to current identifiers. Generally, different types of machines may use different names for codesets, and thus normalizing the parameters may improve efficiency by reducing the need to perform work to generate information already available.

At block 225, the server 150 may determine a set of conversion rules to follow. For example, and not by way of limitation, such a conversion rule may require that a mapping is one to one. In some embodiments, the conversion rules may be determined based on information in the request from the client, information in the server database 160, or both. For instance, the request parameters may include a source codeset and a target codeset, and the server 150 may identify in the server database 160 one or more conversion rules applicable to one or both of these codesets. For another, the request parameters may include one or more conversion rules, and the server 150 may check these received conversion rules for logical issues and may remove any such issues identified.

At decision block 230, the server 150 may determine whether a new mapping table is needed. In some embodiments, this may be determined based on the request parameters, information in the server database 160, or both. For example, if no mapping table exists in the request parameters or in the server database 160 for converting from the source codeset to the target codeset, then it may be determined that a mapping table is needed. In some embodiments, if a mapping table identifier is included in the request parameters, the server 150 may look in the server database 160 for a mapping table matching the mapping table identifier. For another example, if a mapping table was provided but includes duplicate entries or other issues, the server 150 may revise the mapping table to remove such issues.

If a mapping table is needed, then at block 235, the server 150 may generate such a mapping table. For instance, this may be performed by combining a sequence of mapping tables that begin with the source codeset and end with the target codeset. For example, and not by way of limitation, if Codeset A is the source codeset and Codeset B is the target codeset, and if a first mapping table is identified to map Codeset A to Codeset C and a second mapping table is identified to map Codeset C to Codeset B, then the server 150 may generate a mapping table from the source codeset to the target codeset based on the first and second mapping tables. For another example, generating the mapping table may include revising a provided mapping table as described above.

After an appropriate mapping table is available, whether newly generated or previously available, then at block 240 the server 150 may invoke one or more codeset converter compilers available at the server 150 to generate a codeset converter based on the mapping table and, if any, the conversion rules and other parameters. For example, and not by way of limitation, the server 150 may have access to codeset converter compilers for various platforms. Based on the parameters, or based on a detection of the client's platform, the server 150 may select a codeset converter compiler to use. At block 245, the server 150 may generate a codeset converter from the selected codeset converter compiler.

At block 250, the server 150 may generate one or more test cases and use them to verify the codeset converter. These test cases may be generated by the server 150 based on the request parameters or the applicable conversion rules, or both, such that the test cases are designed to test that the request parameters and the conversion rules are respected. At block 255, the server 150 may store in the server database 160 the codeset converter and, if applicable, the newly generated mapping table as well as one or more conversion rules determined at the server 150. At block 260, the codeset converter and the test cases may be returned to the client 110. In some embodiments, the server 150 may also return to the client one or more conversion rules determined on the server-side, and the server 150 may return to the client 110 the mapping table used if that mapping table was not provided by the client 110.

The client 110 may receive the codeset converter, which may comply with the initial parameters and the request parameters. At block 265, if the server 150 provided one or more conversion rules or a mapping table not yet stored in the client database 120, the client 110 may store these in the client database 120. At decision block 270, the client 110 may attempt to verify the codeset converter by applying the codeset converter to the test cases provided by the server 150. If the codeset converter cannot be verified, then at block 275 an error message may be generated at the client 110. However, if the codeset converter is verified, then at block 280 the codeset converter may be committed to use at the client 110. For example, and not by way of limitation, the codeset converter may be installed on the client 110.

Additionally, at block 285, the client 110 may provide feedback to the server 150 regarding the codeset converter received. The mechanism of this feedback may vary. For example, and not by way of limitation, the feedback may be provided manually by the user. For another example, if verification fails at decision block 270, then the client 110 may automatically notify the server 150 of this failure. At block 290, the server 150 may incorporate the feedback into the server database 160. For example, if the codeset converter could not be verified, then the copy of the codeset converter stored in the server database 160 may be deleted or associated with a note of this failure. Thus, this feedback may contribute to crowd-sourcing of the server database 160.

Figure 3:
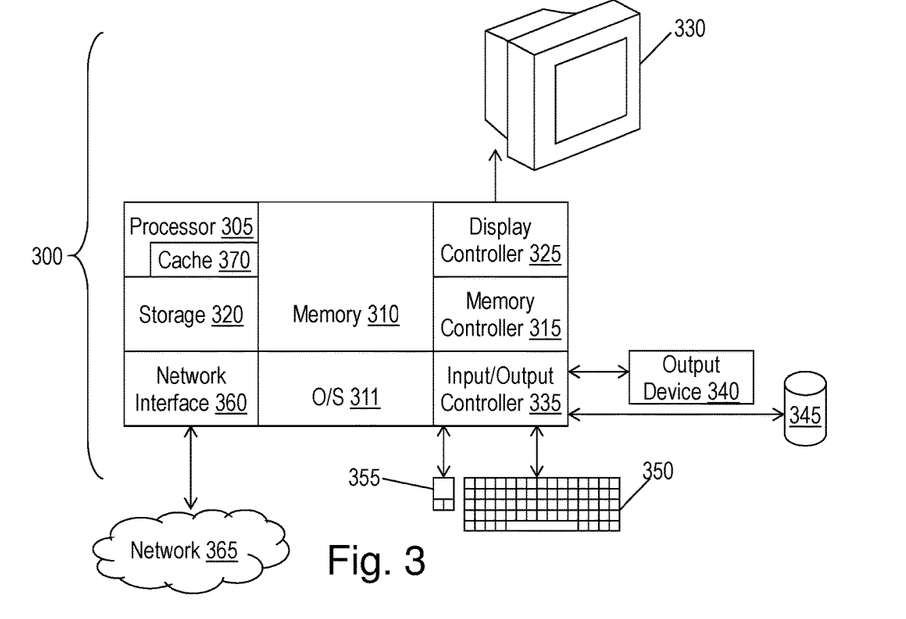
FIG. 3 is a block diagram of a computer system for implementing some or all aspects of the compiler system, according to some embodiments of this invention.

FIG. 3 illustrates a block diagram of a computer system 300 for use in implementing a compiler system 100 or method according to some embodiments. The systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer. For instance, the client 110 or the server 150, or both, may be computer systems 300.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in memory 310 or in storage 320 may include those enabling the processor to execute one or more aspects of the compiler systems 100 and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Compiler systems 100 and methods according to this disclosure may be embodied, in whole or in part, in computer program products or in computer systems 300, such as that illustrated in FIG. 3.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
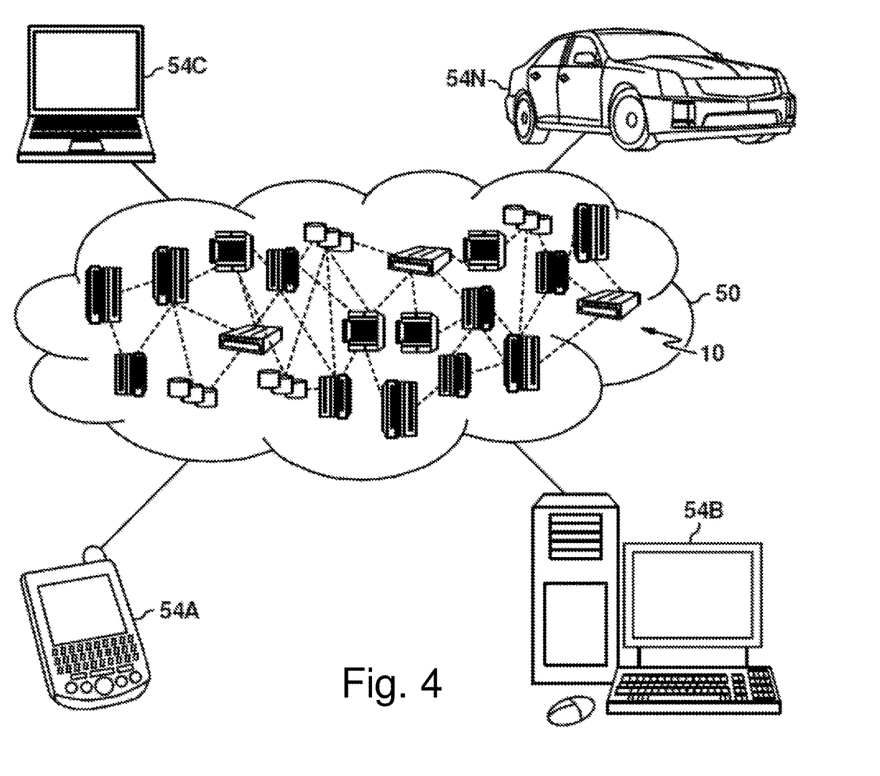
FIG. 4 depicts a cloud computing environment, according to some embodiments of this invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
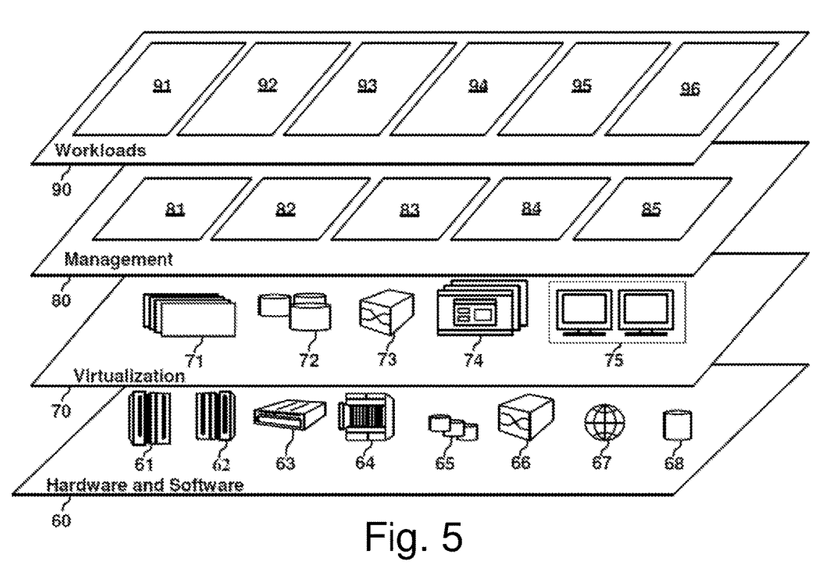
FIG. 5 depicts abstraction model layers, according to some embodiments of this invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and codeset converter compiling 96.

Technical effects and benefits of some embodiments include implementing codeset convertor compiling on SaaS. Specifically, the compiler system 100 may enable users to generate codeset converters through the use of a cloud service, without direct intervention by a service provider. To this end, the compiler system 100 may generate mapping tables on demand. In some embodiments, these operations may be at least partially based on crowd-sourced data, such as feedback resulting from prior codeset converters compiled through the compiler system 100.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving a request for a codeset converter, wherein the codeset converter converts from a source codeset to a target codeset;
    determining that a mapping table applicable to the source codeset and the target codeset does not exist;
    generating the mapping table, responsive to the request for the codeset converter to convert from the source codeset to the target codeset, and responsive to determining that the mapping table does not exist, wherein the mapping table maps from the source codeset to the target codeset;
selecting an applicable codeset converter compiler, from among a plurality of available codeset converter compilers, wherein the applicable codeset converter compiler is configured to compile the codeset converter that converts from the source codeset to the target codeset;
compiling, with the applicable codeset converter compiler and based on the mapping table from the source codeset to the target codeset, the codeset converter responsive to the request, wherein the codeset converter converts from the source codeset to the target codeset; and
returning the requested codeset converter in response to the request.

2. The computer-implemented method of claim 1, wherein the generating, the selecting, and the compiling are performed on software as a service (SaaS).

3. The computer-implemented method of claim 1, wherein the request is received from a codeset compiler, and wherein the generating, the selecting, and the compiling are performed on a same computing device as the codeset compiler.

4. The computer-implemented method of claim 1, further comprising searching a server database for one or more conversion rules applicable to converting from the source codeset to the target codeset.

5. The computer-implemented method of claim 4, wherein the server database is crowd sourced.

6. The computer-implemented method of claim 5, further comprising:
receiving feedback describing the requested codeset converter; and
incorporating the feedback into the server database.

7. The computer-implemented method of claim 1, further comprising:
determining one or more conversion rules applicable to converting from the source codeset to the target codeset; and
generating one or more test cases based on the conversion rules.

8. A system comprising:
a memory having computer-readable instructions; and
one or more processors for executing the computer-readable instructions, the computer-readable instructions comprising:
receiving a request for a codeset converter, wherein the codeset converter converts from a source codeset to a target codeset;
determining that a mapping table applicable to the source codeset and the target codeset does not exist;
generating the mapping table, responsive to the request for the codeset converter to convert from the source codeset to the target codeset, and responsive to determining that the mapping table does not exist, wherein the mapping table maps from the source codeset to the target codeset;
selecting an applicable codeset converter compiler, from among a plurality of available codeset converter compilers, wherein the applicable codeset converter compiler is configured to compile the codeset converter that converts from the source codeset to the target codeset;
compiling, with the applicable codeset converter compiler and based on the mapping table from the source codeset to the target codeset, the codeset converter responsive to the request, wherein the codeset converter converts from the source codeset to the target codeset; and
returning the requested codeset converter in response to the request.

9. The system of claim 8, wherein the generating, the selecting, and the compiling are performed on software as a service (SaaS).

10. The system of claim 8, wherein the request is received from a codeset compiler, and wherein the generating, the selecting, and the compiling are performed on a same computing device as the codeset compiler.

11. The system of claim 8, the computer-readable instructions further comprising searching a server database for one or more conversion rules applicable to converting from the source codeset to the target codeset.

12. The system of claim 11, wherein the server database is crowd sourced.

13. The system of claim 12, the computer-readable instructions further comprising:
receiving feedback describing the requested codeset converter; and
incorporating the feedback into the server database.

14. The system of claim 8, the computer-readable instructions further comprising:
determining one or more conversion rules applicable to converting from the source codeset to the target codeset; and
generating one or more test cases based on the conversion rules.

15. A computer-program product for compiling a codeset converter, the computer program product comprising a computer-readable storage medium having program instructions embodied therewith, the program instructions executable by a processor to cause the processor to perform a method comprising:
receiving a request for a codeset converter, wherein the codeset converter converts from a source codeset to a target codeset;
determining that a mapping table applicable to the source codeset and the target codeset does not exist;
generating the mapping table, responsive to the request for the codeset converter to convert from the source codeset to the target codeset, and responsive to determining that the mapping table does not exist, wherein the mapping table maps from the source codeset to the target codeset;
selecting an applicable codeset converter compiler, from among a plurality of available codeset converter compilers, wherein the applicable codeset converter compiler is configured to compile the codeset converter that converts from the source codeset to the target codeset;
compiling, with the applicable codeset converter compiler and based on the mapping table from the source codeset to the target codeset, the codeset converter responsive to the request, wherein the codeset converter converts from the source codeset to the target codeset; and
returning the requested codeset converter in response to the request.

16. The computer-program product of claim 15, wherein the generating, the selecting, and the compiling are performed on software as a service (SaaS).

17. The computer-program product of claim 15, wherein the request is received from a codeset compiler, and wherein the generating, the selecting, and the compiling are performed on a same computing device as the codeset compiler.

18. The computer-program product of claim 15, the method further comprising searching a server database for one or more conversion rules applicable to converting from the source codeset to the target codeset.

19. The computer-program product of claim 18, wherein the server database is crowd sourced, and the method further comprising:
- receiving feedback describing the requested codeset converter; and
- incorporating the feedback into the server database.

20. The computer-program product of claim 15, the method further comprising:
- determining one or more conversion rules applicable to converting from the source codeset to the target codeset; and
- generating one or more test cases based on the conversion rules.

\* \* \* \* \*